Dec. 15, 1970  W. PECHENICK ET AL  3,547,579
REMOVAL OF SULFATES FROM BRINES

Filed Dec. 19, 1967  2 Sheets-Sheet 2

INVENTORS
GIDEON P. GELBLUM
WILLIAM PECHENICK
BY Ernest J. Cohen
ATTORNEY

United States Patent Office 3,547,579
Patented Dec. 15, 1970

3,547,579
REMOVAL OF SULFATES FROM BRINES
William Pechenick, Lafayette Hill, and Gideon P. Gelblum, Philadelphia, Pa., assignors to the United States of America as represented by the Secretary of the Interior
Filed Dec. 19, 1967, Ser. No. 691,780
Int. Cl. C01d 1/04, 7/12
U.S. Cl. 23—38                    13 Claims

ABSTRACT OF THE DISCLOSURE

An improved method for the removal of sulfates from brines is presented. It involves contacting the brine with an ion-exchange resin in the barium form thereby precipitating the sulfates as barium sulfate and converting the resin to an alternate metal form. The precipitated barium sulfate is reduced to barium sulfide which is then leached with water to form an equimolar solution containing barium hydroxide and barium hydrosulfide. Barium hydroxide is separated from this solution by an evaporative concentration. A solution of barium hydroxide and the remaining barium hydrosulfide are separately used to regenerate the spent resin to the barium form. Sodium hydroxide and sodium hydrosulfide solutions resulting from resin regeneration are then used to produce valuable by-products. The process may be used to remove sulfates from brines prior to a saline water conversion step.

This invention resulted from work done by Catalytic Construction Company under Contract No. 14–01–0001–1175 with the Office of Saline Water of the Department of the Interior. In accordance with the requirements of that contract, the domestic title to the invention is in the Government.

CROSS REFERENCE TO RELATED APPLICATION

The embodiment of the present invention comprising a brine desulfating process is an improvement over commonly assigned U.S. Pat. 3,378,336 by George et al., entitled "Sulfate Removal From Brines," filed June 17, 1966.

BACKGROUND OF THE INVENTION

Field of invention

This invention relates to the separation and recovery of inorganic chemicals. It is primarily concerned with the formation and recovery of barium hydroxide and barium hydrosulfide from barium sulfide. However, it is also concerned with the employment of said formation and recovery process in other chemical recovery operations, particularly those relating to the treatment of sulfate containing brines for the purpose of producing potable water and minerals.

Description of the prior art

Until the present invention little was known about the formation and separation of barium hydroxide from barium sulfide solutions, moreover, the literature contains many contradicting statements. One portion of the prior art taught that, "When barium sulfide is extracted with water at all temperatures up to 100° C., barium hydroxyhydrosulfide, $Ba(SH)(OH) \cdot 5H_2O$, is formed," and ". . . under no circumstances can barium hydroxide be separated from the solution by crystallization."[1] On the other hand, others[2, 3, 4] claimed success in doing so.

[1] J. W. Mellor, A Comprehensive Treatise on Inorganic and Theoretical Chemistry, vol. III, p. 742 (1923).
[2] U.S. Patent 720,927.
[3] U.S. Patent 1,316,133.
[4] British Patent 980,813.

Knowledge of barium hydroxide recovery has been limited to the method of shock cooling as presented in patents to Jacobs,[2] Barnes,[3] and Marshall et al.[4] The Jacobs patent is directed to the purification of a barium oxide containing barium sulfide impurities. This task is accomplished by the steps of hydrolysis, boiling and shock cooling. The Barnes patent teaches a process whereby barium hydroxide is crystallized by rapidly cooling a barium sulfide solution of very low concentration from an initial temperature of from 15 to 20° C. to a temperature between 0 and 5° C. Similarly, Marshall et al. depend upon cooling to crystallize barium hydroxide from an aqueous solution of barium sulfide.

The major problem with a shock cooling technique is that unless the concentration of the initial barium sulfide solution is kept very low, the process necessarily passes from a high temperature where barium hydroxide is soluble through a temperature range where the double salt forms and is insoluble to a point where barium hydroxide is insoluble. Consequently, the inability to produce instantaneous cooling inevitably results in a certain amount of double salt formation.

We have now found that through a controlled leaching and crystallization technique barium hydroxide and barium hydrosulfide may be formed and separated one from the other at temperatures and concentrations heretofore believed unobtainable.

As will be appreciated by those skilled in the art, this new technique not only allows for the preparation and separation of barium hydroxide and barium hydrosulfide but may also become a key component in other chemical recovery operations, particularly those associated with chemical recovery from brines containing sulfates. In this connection, one preferred embodiment of the invention consists of an improvement of the process disclosed in U.S. Pat. 3,378,336. In that process, a sulfate bearing saline solution containing dissolved alkali and alkaline earth metal salts is contacted with a cation exchange resin in the barium form, thereby simultaneously precipitating the sulfate as barium sulfate, and converting the resin mainly to the alkali metal form. The resin and suspension of barium sulfate and brine are separated, and the barium sulfate is recovered from the desulfated brine. The recovered sulfate is roasted with a reducing agent to form the sulfide which is leached with water to form a solution of barium hydroxide and barium hydrosulfide. This solution is used to convert the spent resin back into the barium form for further use. Treatment of the effluent liquor from the resin regeneration step, in that process, yields sodium carbonate and sulfur products. While the George et al. process represents a significant improvement in the art, the attraction of the process is diminished to some extent by the total conversion of removed sodium into low value sodium byproducts such as sodium bicarbonate and sodium carbonate.

Through the use of the present invention, we are able to provide an improved brine desulfating process wherein a significant portion of the metal eluted during resin regeneration is converted directly to the hydroxide form.

Brine desulfation is important as a pretreatment in both potable water production by distillation and in minerals recovery by fractional crystallization. Consequently, the use of the present invention which allows economical desulfation of brines will have great utility in both of these areas.

SUMMARY OF THE INVENTION

This invention resides in a new and novel process of forming and separating barium hydroxide and barium hydrosulfide from barium sulfide. It is useful by itself for the production of barium hydroxide from barium sulfide or barium sulfate and may also form an integral part of a novel brine desulfating process to be used as a pretreatment for the production of potable water or minerals from brines while at the same time converting metal and sulfur components of the brine into valuable products including metal hydroxides and sulfur products such as sulfuric acid.

Accordingly, it is one general object of the invention to provide a new and useful process for the formation of barium hydrosulfide and barium hydroxide from barium sulfide.

It is an additional general object to provide new and novel processes for the recovery of valuable products and byproducts from brines.

Still further, it is an object of this invention to provide an improved brine desulfating process for use as a pretreatment with desalination or mineral recovery systems.

DESCRIPTION OF PREFERRED EMBODIMENTS

Figure 1:
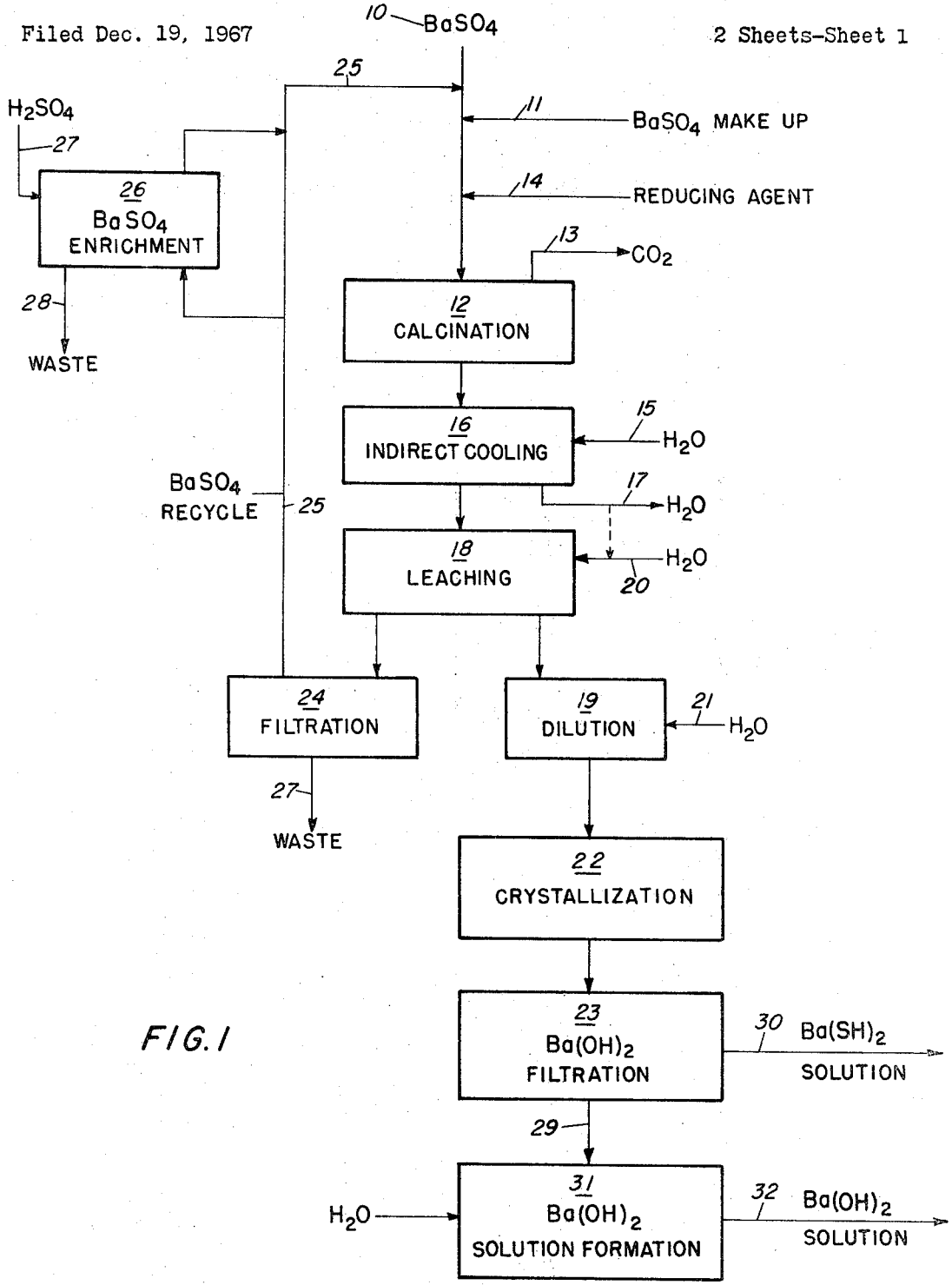
FIG. 1 is a flow diagram showing a process for the formation and separation of barium hydrosulfide and barium hydroxide from barium sulfide or barium sulfate.

The basic process of the invention is diagrammatically illustrated in FIG. 1. The success of this process and other processes containing it revolves around a novel formation and separation of barium hydrosulfide and barium hydroxide from barium sulfide.

In FIG. 1, barium sulfate 10, recycled barium sulfate 25 and make up barium sulfate 11 are fed to calcination zone 12 where they are roasted with a reducing agent 14 to produce carbon dioxide 13 and barium sulfide according to the following well-known reaction:

$$BaSO_4 + 2C \xrightarrow{(800°-1100°C.)} BaS + 2CO_2$$

The reducing agent used may be selected from a variety of fuels and carbonaceous materials including: coal, charcoal, lignite, petroleum coke, producer gas, natural gas, water gas, hydrogen, methane, oil, or by mixtures of these agents. A preferred method to effect the reduction consists of predrying the wet cake of barium sulfate to contain from 5 to 10 weight percent moisture, thoroughly mixing fine ground coal, 100 to 200 mesh, with the semidry agglomerate of barium sulfate fines, pelletizing the mixture into balls having a diameter of from 0.2 to 0.4 inch and post-drying them to set their green strength. The nearly bone dry pellets are fed into a directly fired rotary, cement type kiln countercurrently to the fired fuel. The actual reduction is carried out at a temperature between 900 and 1100° C., for from 45 to 20 minutes and in oxygen depleted atmosphere. Using this technique the conversion rate is about 92 percent. The barium sulfide produced is very reactive at high temperatures and is rapidly oxidized back to the sulfate form. Hence it is desirable to cool the calcine prior to any other treatment.

Cooling of barium sulfide from the calcination zone is preferably accomplished by indirect heat exchange with water as for example in a conventional water tube rotary cooler. FIG. 1 shows an indirect cooling of the calcined product in zone 16. Water 15 is the coolant supplied and water 17 is the heated effluent from zone 16. The amount of cooling is preferably controlled so as to reduce the possibility of double salt formation in subsequent hydrolysis operation in leaching zone 18. Consequently, cooling in zone 16 will proceed until the calcine is at or slightly above the desired leaching temperature.

Following cooling in zone 16 the calcine is ground by conventional means (not shown) to a convenient size, for example, from about 50 to 100 mesh. Next the calcine is contacted with a hot water stream 20 in leaching zone 18. As shown in FIG. 1, stream 20 may comprise effluent water 17 from cooling zone 16. The objective of the leaching step is to hydrolyze barium sulfide into barium hydrosulfide and barium hydroxide without formation of barium hydroxide-hydrosulfide doble salt and without unnecessary dilution. The temperature of the hydrolysis should be in the general range of from about 50 to 120° C. Preferably, the temperature is maintained in excess of the melting point of barium hydroxide octa-hydrate and in the range of from about 80° to 100° C. Enough hot water 20 is added to give a solution having a concentration of from 13 to 25 weight percent based on barium sulfide content. Leaching in zone 18 is preferably, though not necessarily, carried out in a multistage countercurrent fashion in a mixer-settler unit.

Under the conditions set out barium sulfide is converted into equimolar portions of barium hydrosulfide and barium hydroxide according to the following reaction:

$$2BaS + 2H_2O \rightarrow Ba(SH)_2 + Ba(OH)_2$$

The overflow product leaving the leaching-hydrolyzing step 18 is rapidly diluted with process water 21 in zone 19 to a concentration of barium compounds equivalent to 13 weight percent of barium sulfide at 57° C. A lower concentration is necessary for higher temperatures, but at lower final dilution temperatures even higher concentrations can be tolerated as long as the temperature-concentration points are controlled to keep a homogeneous one phase system. This diluted and clear solution comprises the feed to the barium hydroxide crystallizer. The insolubles consisting of ash and unconverted barium sulfate leave leaching zone 18 in a slurry that is fed to a filtration or centrifugation zone 24 where barium sulfate 25 is recovered and recycled to the calcination zone 12 and waste ash 27 is discarded. Depending upon the reducing agent 14 used in calcination zone 12, the barium sulfate recycle may be treated in an enrichment zone 26 with sulfuric acid 27 to assure a relatively pure recycle. The residue of such a treatment will constitute waste 28.

Crystallization zone 22 is an evaporative concentration process. Unlike prior separations where barium hydroxide is crystallized from solutions of barium sulfide by thermal shock procedures involving rapid cooling, the present invention by evaporating the hydrolyzed solution adiabatically accomplishes a simultaneous increase in barium hydroxide concentration and decrease in barium hydroxide solubility. The result is a precipitation of the barium hydroxide component of the hydrolyzed solution. Water is removed by vacuum evaporation, preferably in multiple stages, until barium hydroxide precipitation diminishes. Thus the preferred thermodynamic condition is adiabatic, crystallization may also be effected isothermally.

Barium hydroxide precipitate and barium hydrosulfide liquor pass from crystallization zone 22 to filtration zone 23 where the mixture is separated into stream 30 consisting primarily of barium hydrosulfide and stream 29 consisting of barium hydroxide precipitate. Barium hydroxide may be recovered in the solid form from stream 29, or, if desirable it can be put into the form of a solution, 32, by contact with water as shown in zone 31 of FIG. 1.

The above described novel process allows for the first time an economical and efficient means of forming and separating barium hydroxide and barium hydrosulfide from barium sulfide. Though in an of itself this is an important discovery, its primary utility will be found as a component of processes designed to extract valuable materials from natural or industrial brines.

Figure 2:
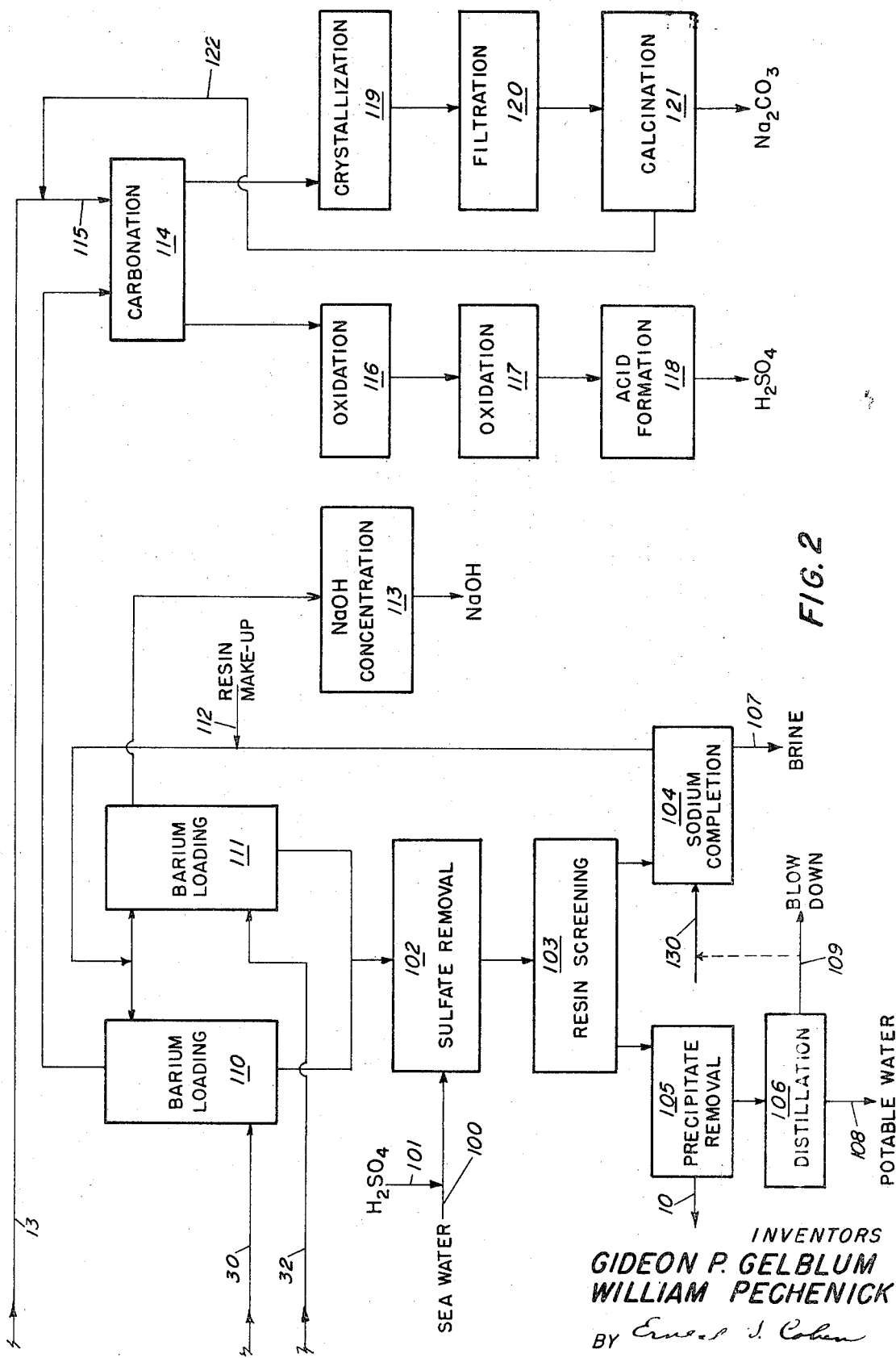
FIG. 2 is a flow diagram showing a preferred form of the invention used to desulfate brines prior to distillation or mineral recovery.

In this connection, reference is made to FIG. 2 which schematically illustrates a novel process for the recovery of valuable products from sea water. A sea water feed 100, screened to remove particulate matter, is fed to a barium elution and sulfate precipitation zone 102 where it is contacted with a barium loaded ion-exchange resin.

If the raw sulfate bearing water contains carbonates dissolved or bonded, or has a pH higher than 7, sulfuric acid 101 is preferably injected prior to the barium elution step. This acidification removes carbonates from the feed and enhances the rate of barium sulfate precipitation. Preferably, acid will be added until the pH of the brine is below 7.

Though the physical and chemical form of the resin is not critical to the operation of the process, strongly acid nuclear-sulfonic resins such as cross-link polystyrenes are preferred. Examples of this type of a resin are: Dowex 50, IR–120, Amberlite 200, Nalcite HCR, Permutit Q, Duolite C–20 and C–25 and Lewatit X–100.

As a result of the contact between the resin and the sea water the barium content of the resin reacts with the sulfate present in the sea water to form an insoluble barium sulfate precipitate while the resin is converted to an alternate metal form according to the general equations:

$$M(SO_4)b/2 + (Ba)a/2R \rightarrow M_aR_b + BaSO_4$$

where:

$M$ = a metal cation contained in the brine
$R$ = resin
$a$ = valence of resin
$b$ = valence of metal and more specifically, $$2M^+ + SO_4^= + BaR_2 \rightarrow BaSO_4 + 2MR$$

where:

$M^+$ = a single valence metal (i.e., $Na^+$ or $K^+$)
$R$ = resin $$M^{++} + SO_4^= + BaR_2 \rightarrow BaSO_4 + MR_2$$

where:

$M^{++}$ = a double valence metal (i.e., $Ca^{++}$ or $Mg^{++}$)
$R$ = resin

With most resins, a divalent metal ions are loaded in preference to single valence ions. In the case of sea water 100, which contains appreciable quantities of calcium and magnesium, up to 50% of the loading in zone 102 will be by these metals. Other metals contained in sea water include potassium and lithium which will be loaded to a lesser extent.

Care should be taken during contact in zone 102 to prevent deleterious barium sulfate formation within the resin particles. To assure barium sulfate formation in solution rather than within the resin, the rate of sulfate ion metered to elution zone 102 is controlled so that it does not exceed the rate at which barium ion leaves the resin and enters the solution. The result being the maintenance of some free barium ion in solution at all times. For brines such as sea water, a concentration of from about 0.01 to 0.1 gram of free barium per liter is preferred. This amount should be greater for brines higher in sulfate content and may be less for brines lower in sulfate conten. Contact between sea water 100 and the resin may be carried out in agitated tanks or moving beds in single or multiple stages. Preferably, the exchange is made in a multistage agitated tank cascaded system wherein sea water 100 moves concurrently with the resin particles.

Converted resin, desulfated brine and precipitates are supplied to resin screening zone 103 from contact zone 102. In zone 103, the resin is separated from the desulfated sea water by screening. After separation, the converted resin is sent to zone 104 and the desulfated brine together with precipitates are fed to zone 105 where the precipitates are collected and separated by conventional thickening and filtration techniques. The treated and clarified sea water from zone 105 is an excellent feed to desalination zone 106. The treated sea water is depleted of all its carbonates, all or nearly all, sulfate ions and part of the calcium and magnesium ions are removed as well. Consequently, the problems of sulfate scale during desalination are obviated, those problems of alkaline magnesium scale reduced and the overall content of dissolved salts reduced by over twelve percent by weight.

This in turn permits operating distillation type plants at temperatures up to 180° C., more efficient operations at conventional desalination conditions and increased concentration ratios.

These attributes are important to several desalination processes and in particular to large scale multistage and multieffect flash processes such as that described in U.S. Pat. 3,320,137 to Jebens et al. The products of the distillation zone 106 are potable water 108 and blow down 109. A portion of the blow down can be used to complete the conversion of the resin separated in zone 103 to the sodium form in a sodium completion zone 104. However, in this process it is preferred either to make up a fresh aqueous solution 130 of sodium compound of about four normal or add such to the blow down to get a four normal sodium solution. The sodium compound used can be sodium chloride, carbonate, hydroxide, sulfate, etc. The concentration of four normal in this regeneration liquid is common practice and of significance if a complete and quick elution of the calcium and magnesium is required, as in this process. The sodium completion step can be done either in an agitated vessel or in a moving bed operation. Here, the divalent metal ions which were previously loaded on the resin are carried away in brine 107. It will be appreciated that the effluent brine 107 from zone 104 will contain enriched quantities of calcium, magnesium, and also some potassium which are amenable to recovery by conventional procedures. For example, brine 107 will be a superior source of magnesium than raw sea water now ordinarily used.

Returning now to zone 105, the precipitate of barium sulfate is herein separated such as by filtration from the desulfated sea water and collected to form a barium sulfate feed 10 which is sent to a process as shown in FIG. 1. When the process shown in FIG. 1 is used in conjunction with the type shown in FIG. 2, barium sulfate stream 10 will comprise the majority of barium sulfate input to calcination zone 12. Thus, in the manner previously described with reference to FIG. 1, barium sulfate 10 is converted into a barium hydrosulfide solution 30 and a barium hydroxide solution 32.

Both the hydrosulfide solution and the hydroxide solution are used to regenerate the sodium resin from sodium completion zone 104 into the barium form. Resin regeneration can be accomplished by various ion exchange techniques in zones 110 and 111 according to the following reactions:

$$Ba(SH)_2 + 2NaR \rightarrow BaR_2 + 2NaSH$$
$$Ba(OH)_2 + 2NaR \rightarrow BaR_2 + 2NaOH$$

where:

$R$ = resin

Preferably, zones 110 and 111 consist of moving bed columns in which the resin descends by gravity in countercurrent relationship to the barium solution. Before the resin is recycled to zone 102 it is thoroughly washed with water.

The resin's preference for barium allows these reactions to proceed with great efficiency. However, through use the resin will become spent and additional resin 112 in the sodium form may be fed to zones 110 and 111.

The barium resin recovered from zones 110 and 111 is fed to the barium elution and sulfate precipitation zone 102 starting a new resin cycle. The lean sodium hydroxide solution, which will generally be from 10 to 20 percent in concentration, recovered from zone 111 is concentrated at zone 113 to produce a valuable sodium hydroxide product. Sodium hydrosulfide of from about 5 to 15 weight percent from zone 110 is converted into valuable products in a carbonation zone 114 with a carbon dioxide containing gas 115. As shown in FIG. 1, a gas 13 containing carbon dioxide is available from barium sulfate calcination zone 12 and also gas 122 containing carbon dioxide is available from bicarbonate calcination zone 121. The carbonation produces hydrogen sulfide and sodium bicarbonate according to the following reaction:

$$H_2O + NaSH + CO_2 \rightarrow H_2S + NaHCO_3$$

The hydrogen sulfide produced by this reaction may be reduced or oxidized to various stages to produce sulfur, sulfur dioxide or sulfur trioxide, the latter of which may be hydrolyzed to form sulfuric acid. FIG. 2 shows the oxidation of $H_2S$ in zone 116 to form sulfur dioxide and in zone 117 to form sulfur trioxide which can easily be converted by well known means to a sulfuric acid product in zone 118.

The sodium bicarbonate produced in carbonation zone 114 is crystallized in zone 119, filtered in zone 120 and calcined in zone 121 to produce a carbon dioxide 122 and a sodium carbonate product.

The advantages of the desulfating process over prior art processes designed to descale brines prior to conversion by distillation are numerous. Major scale formers are effectively removed, salt content is being reduced and at the same time, valuable byproducts are recovered.

The desulfating process also has utility in the extraction of minerals from natural and industrial brines where the presence of sulfates is deleterious to fractional crystallization techniques. Further, it will be recognized that although sodium hydroxide, sulfur, sulfuric acid and sodium carbonate are referred to herein as by products the process of the present invention may be primarily directed to their production.

We claim:

1. A method of removing sulfate ions from brines containing the same wherein said brines also contain cations of at least one metal, comprising the steps of:
   (a) contacting said brine with a strong cation exchange resin in the barium form thereby forming a precipitate containing barium sulfate, converting said resin to at least one metal form thereof, said form having the general formula:

$$(M_aR_b)$$

where:
   M = a metal cation contained in the brine
   R = resin
   $a$ = valence of resin
   $b$ = valence of metal and producing a desulfated brine;
   (b) separating said converted resin from said desulfated brine and precipitate;
   (c) separating said precipitate from said desulfated brine;
   (d) calcining said separated precipitate together with a carbonaceous reducing agent to form barium sulfide;
   (e) leaching said barium sulfide with water to form a solution having a concentration of about 13 weight percent based on barium sulfide content and at a temperature of from about 50–120° C. such that a homogeneous one phase system is formed and whereby said sulfide is hydrolyzed into equimolar proportions of barium hydrosulfide and barium hydroxide;
   (f) concentrating the solution formed in step (e) by evaporation to initiate crystallization of barium hydroxide;
   (g) continuing said concentration until barium hydroxide crystallization ceases;
   (h) separating said barium hydroxide crystals formed in step (g) from the concentrated solution containing barium hydrosulfide;
   (i) redissolving said barium hydroxide in water to form a barium hydroxide solution;
   (j) contacting a portion of the resin in the $M_aR_b$ form produced in step (a) with the solution formed in step (h) to reconvert the resin to the barium form and to produce a hydrosulfide solution having the general formula $M(SH)_b$;
   (k) contacting the remaining portion of the resin in the $M_aR_b$ form produced in step (a) with the solution formed in step (i) to reconvert the resin to the barium form and to produce a solution having the general formula $M(OH)_b$; and
   (l) recycling the barium form resin produced in steps (j) and (k) to step (a).

2. The method of claim 1 wherein step (e) is performed in the range of from about 80 to 100° C. to form a solution having a concentration of from greater than 13 to about 25 weight percent measured by original barium sulfide content, and wherein said leaching step is followed by a rapid dilution of the hydrolyzed leach prior to the evaporative crystallization.

3. The method of claim 1 wherein said brine contains sodium ions, said metal in step (a) being sodium, said hydrosulfide solution produced in step (j) being sodium hydrosulfide and said hydroxide solution produced in step (k) being sodium hydroxide.

4. The method of claim 3 wherein said sodium hydrosulfide solution is carbonated to produce hydrogen sulfide and sodium bicarbonate.

5. The method of claim 4 wherein said sodium bicarbonate is converted to sodium carbonate.

6. The method of claim 1 wherein said brine contains in addition to said sulfate ions, sodium ions and ions selected from the group consisting of potassium, calcium, magnesium, and lithium, or mixtures thereof, and wherein said metal in step (a) is a mixture of sodium and a member of said group and wherein prior to steps (j) and (k), the converted resin of step (a) is contacted with a concentrated sodium solution thereby causing said resin to be converted substantially entirely to the sodium form and producing a solution containing ions of said member of said group, and wherein the hydrosulfide solution produced in step (j) is sodium hydrosulfide and wherein said hydroxide solution produced in step (k) is sodium hydroxide.

7. The method of claim 6 wherein said concentrated sodium solution is obtained by concentrating said desulfated brine.

8. The method of claim 7 wherein said concentration is by distillation to produce potable water in addition to said sodium solution.

9. The method of claim 8 wherein said brine is sea water.

10. The method of claim 9 wherein sulfuric acid is injected into the feed sulfate bearing brine prior to the barium elution step to remove all carbonates present in said sea water.

11. The method of claim 10 wherein said sodium hydorsulfide solution is carbonated to produce hydrogen sulfide and sodium bicarbonate and wherein said hydrogen sulfide is converted to a member of the group consisting of sulfur, sulfur dioxide and sulfuric acid, and wherein said sodlum bicarbonate is converted to sodium carbonate.

12. The method of claim 10 wherein the amount of sulfuric acid is injected into the feed sulfate bearing brine prior to the barium elution step to reduce the feed akalinity to a pH of 7 or lower.

13. The method of claim 12 wherein said sodium hydroxide solution produced in step (l) is further concentrated.

References Cited

UNITED STATES PATENTS

| | | | |
|---|---|---|---|
| 1,316,133 | 9/1919 | Barnes | 23—186 |
| 2,782,099 | 2/1957 | Haines et al. | 23—186 |
| 3,119,752 | 1/1964 | Checkovich | 203—11X |
| 3,378,336 | 4/1968 | George et al. | 23—64 |

OSCAR R. VERTIZ, Primary Examiner

G. T. OZAKI, Assistant Examiner

U.S. Cl. X.R.

23—63, 64, 134, 167, 177, 181, 184, 186